Figure 1:
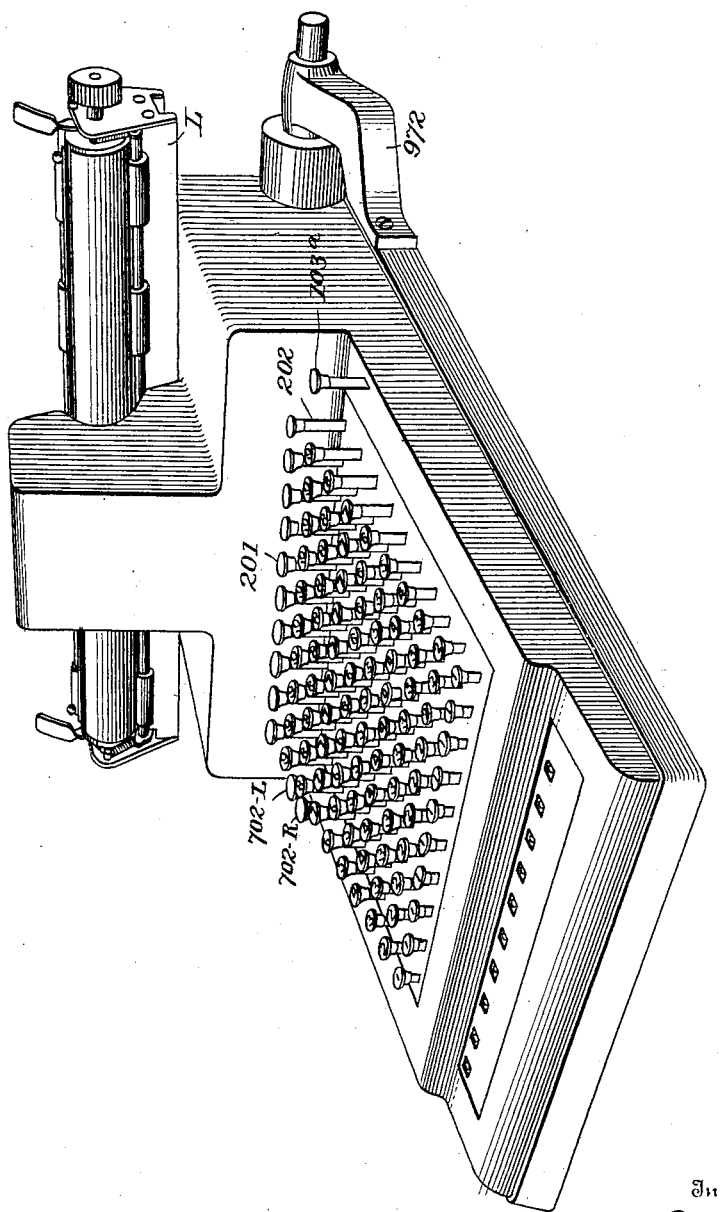

No. 763,692. PATENTED JUNE 28, 1904.
W. H. PIKE, JR.
ADDING AND RECORDING MACHINE.
APPLICATION FILED AUG. 19, 1902.
NO MODEL. 13 SHEETS—SHEET 1.

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 3.

No. 763,692. PATENTED JUNE 28, 1904.
W. H. PIKE, JR.
ADDING AND RECORDING MACHINE.
APPLICATION FILED AUG. 19, 1902.

NO MODEL. 13 SHEETS—SHEET 4.

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 5.
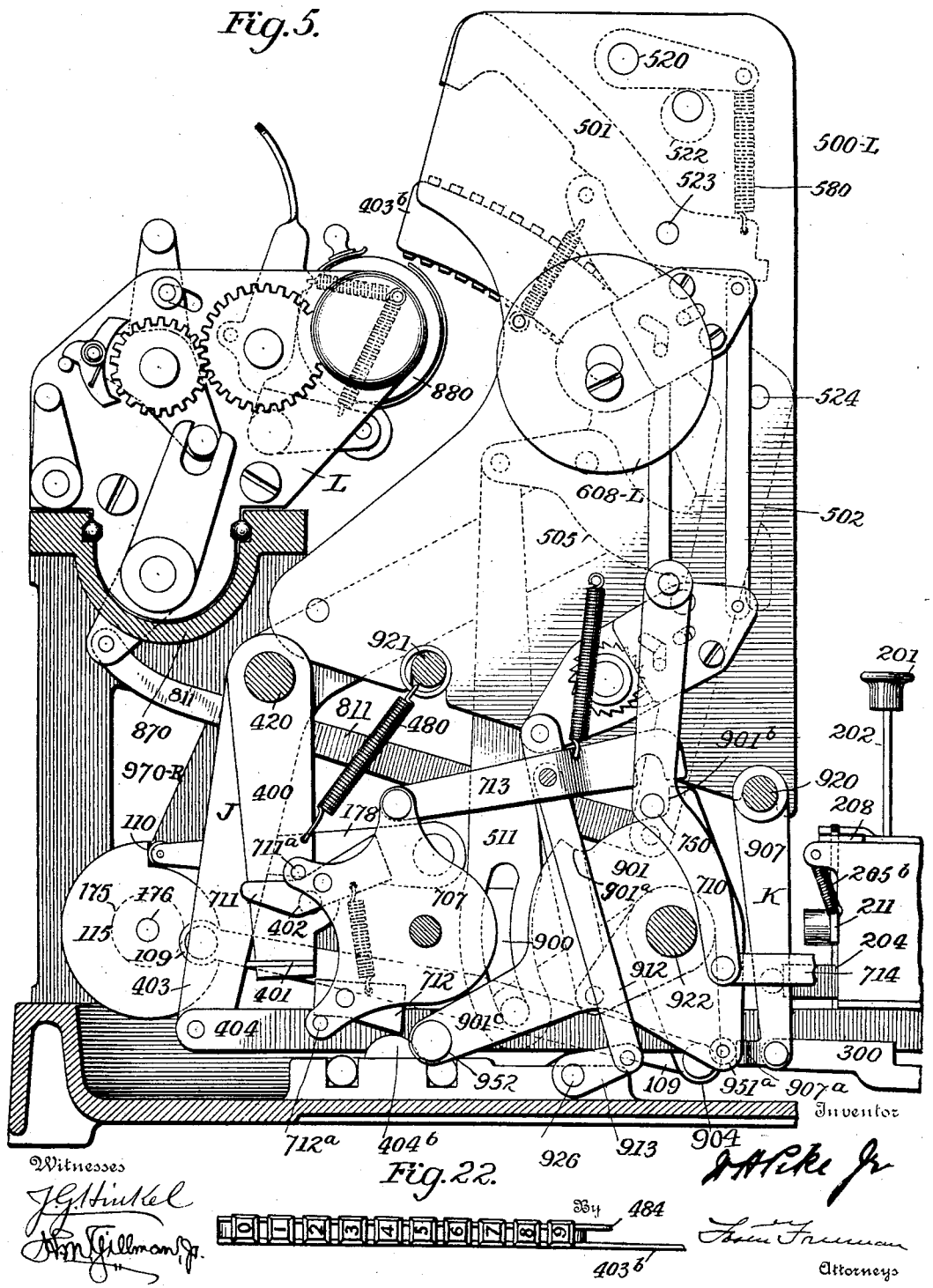

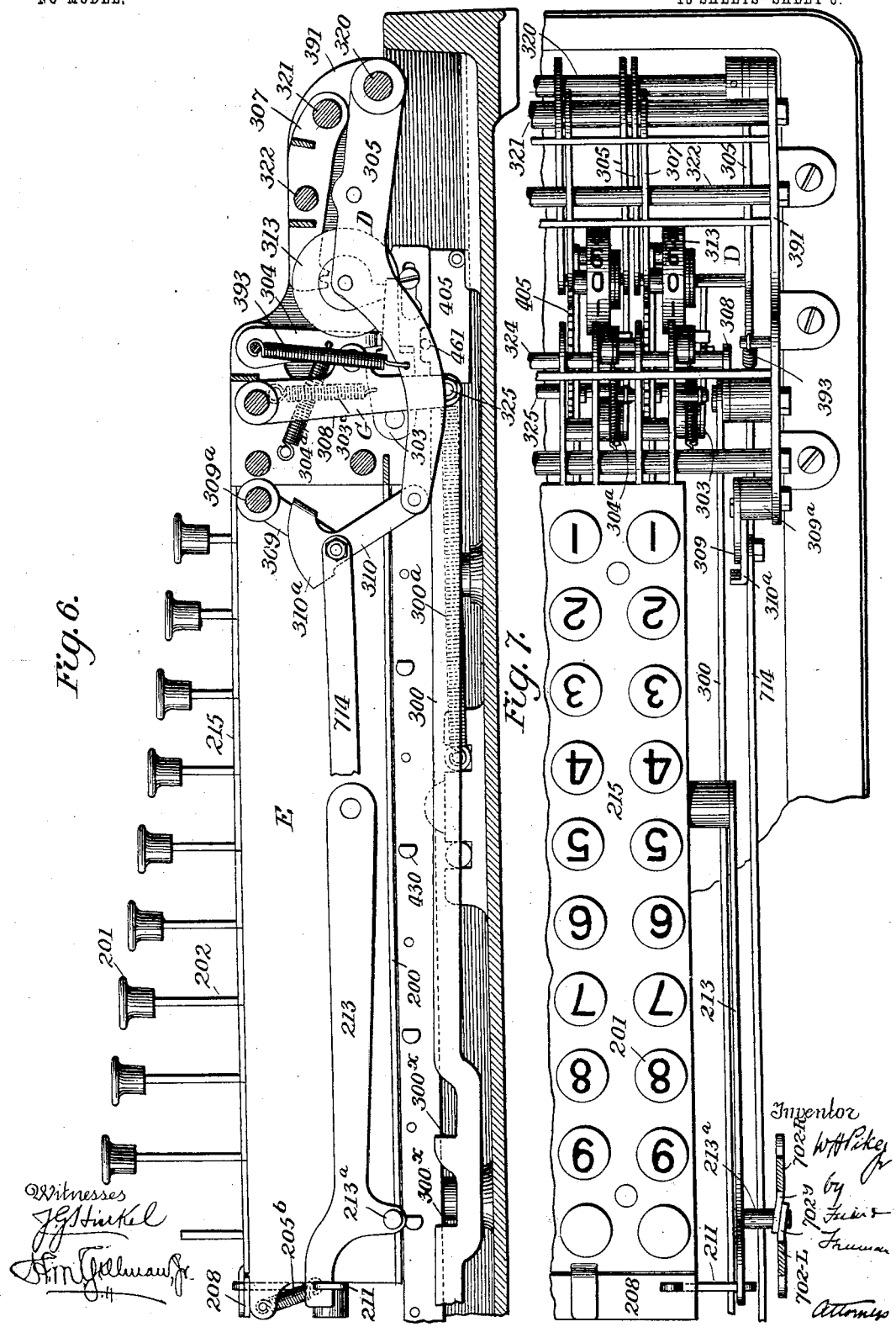

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 7.
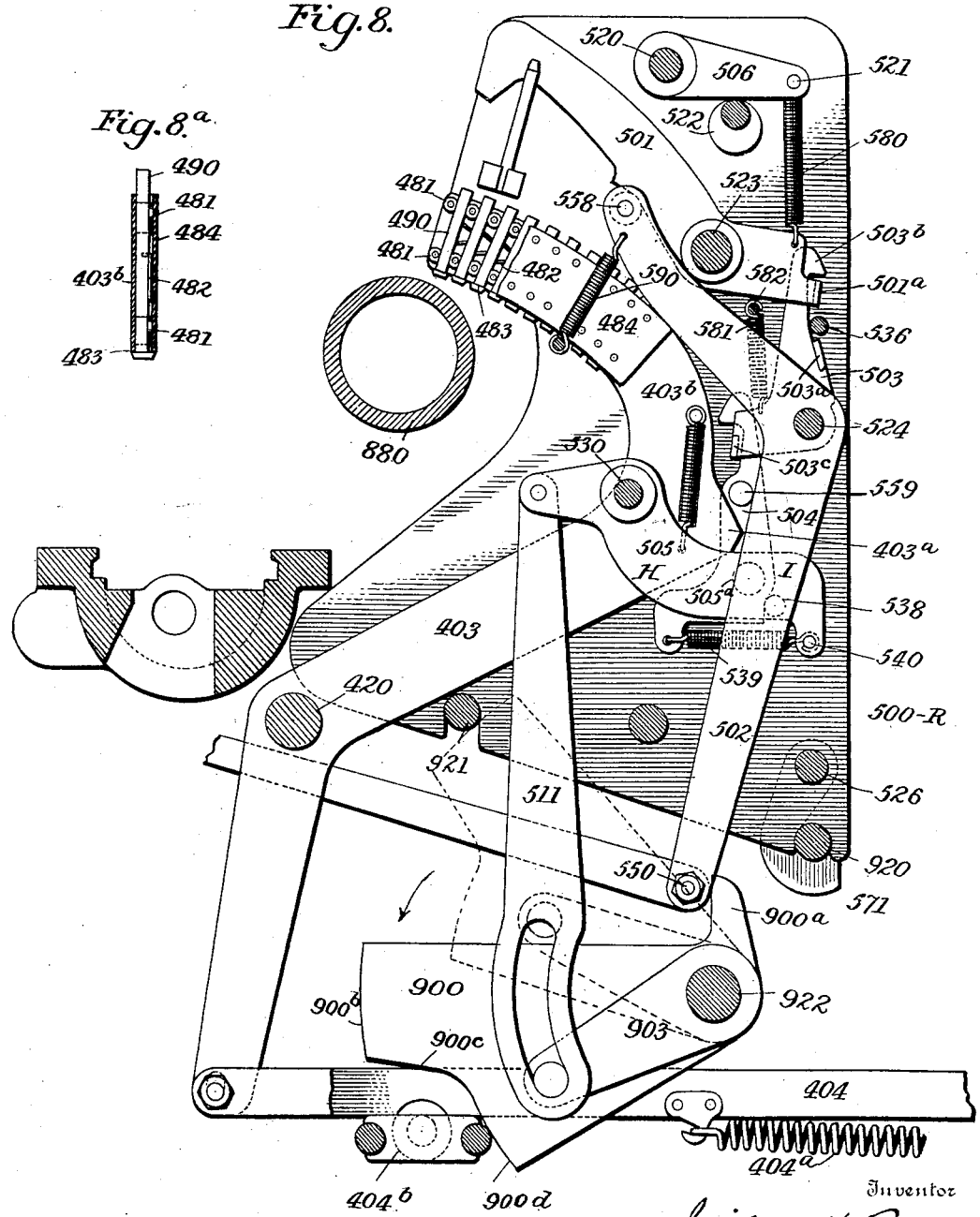

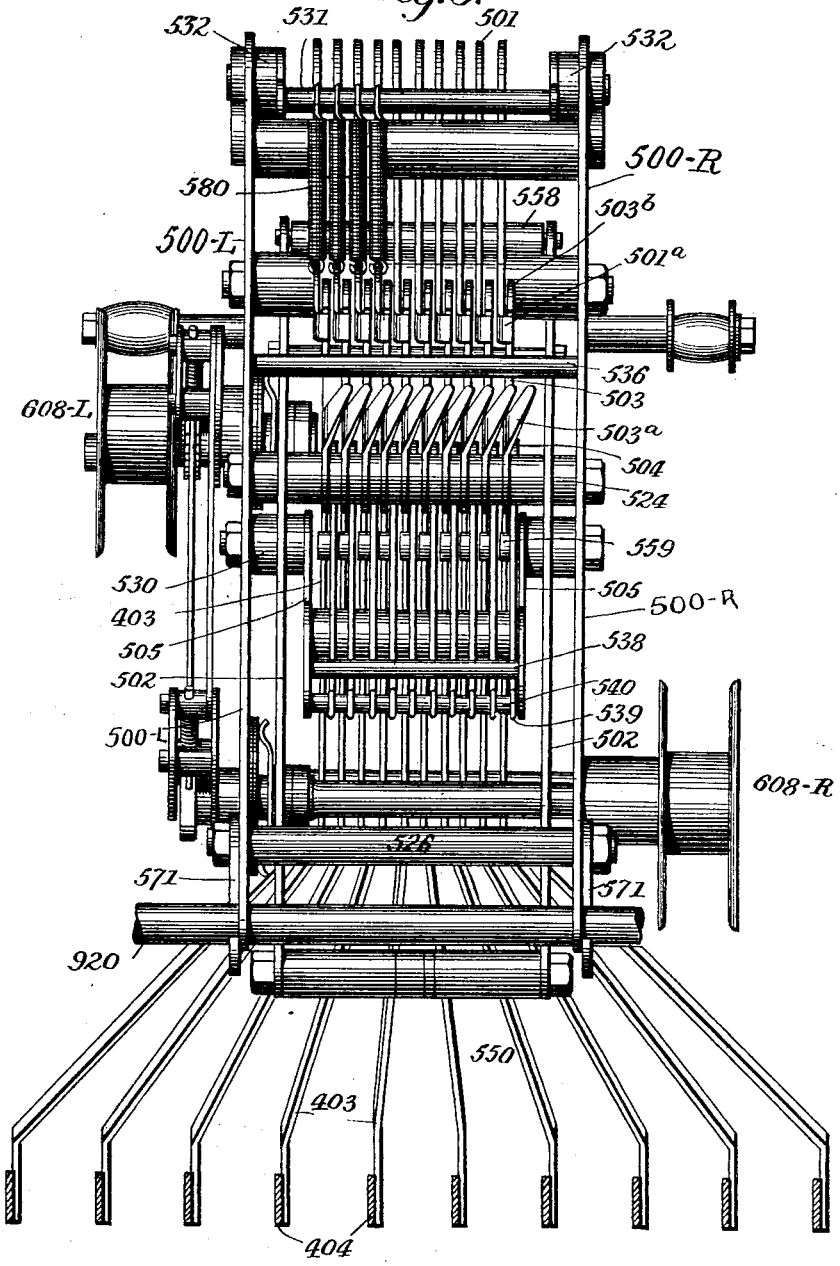

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 9.

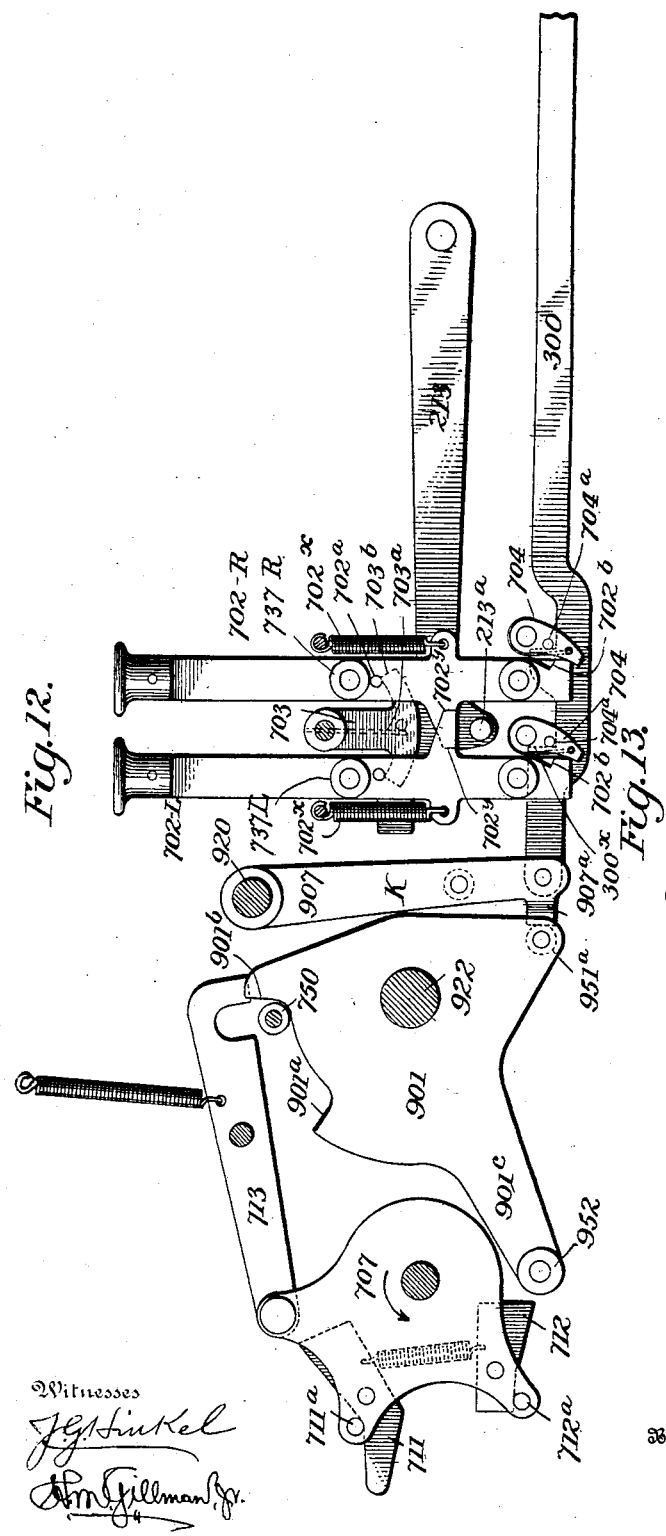
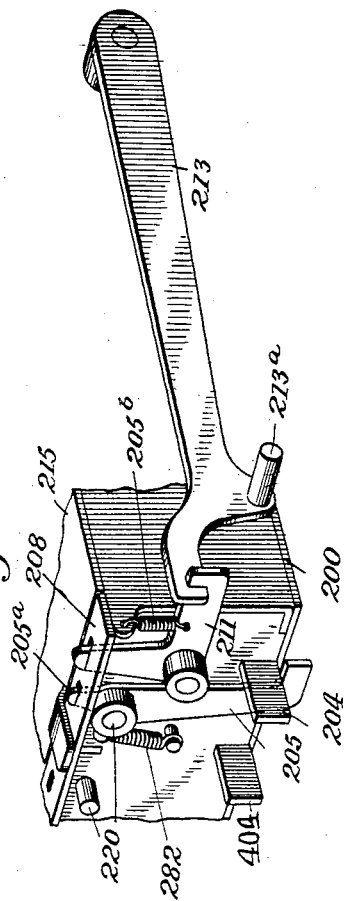

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 11.

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 12.
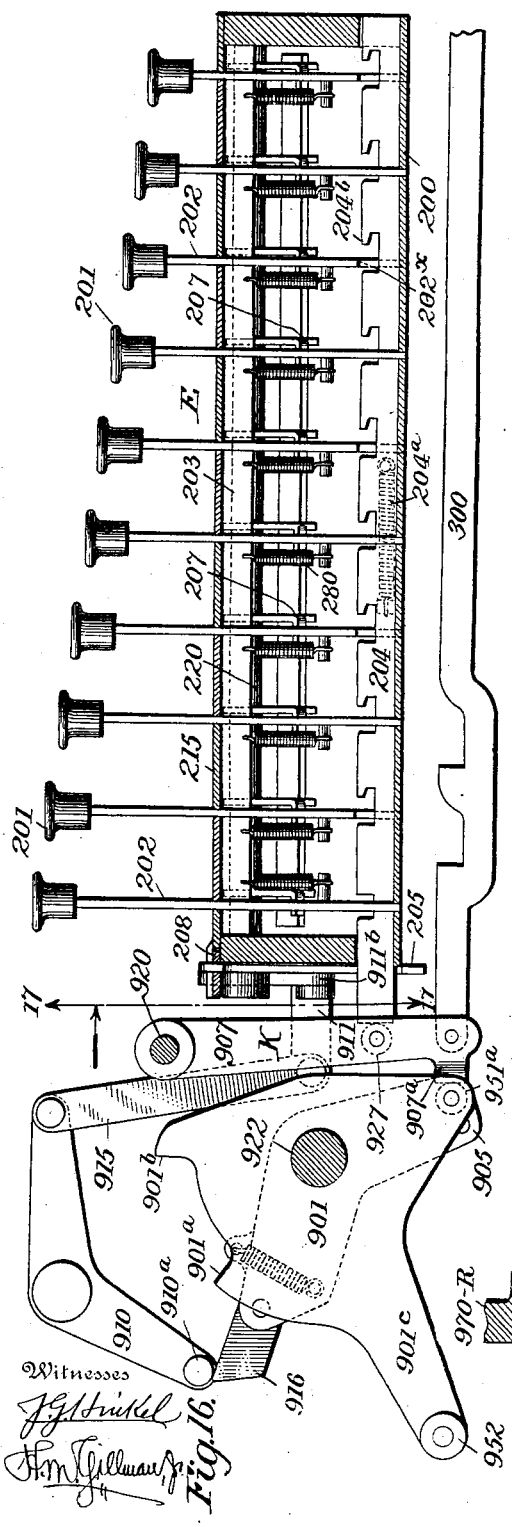
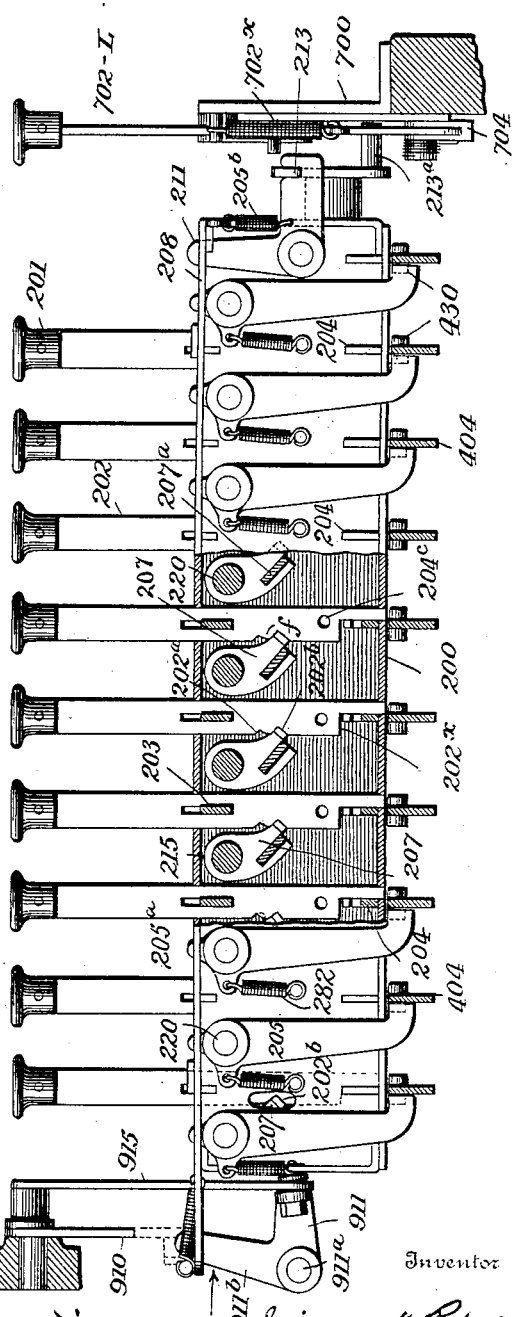

No. 763,692. PATENTED JUNE 28, 1904.
W. H. PIKE, Jr.
ADDING AND RECORDING MACHINE.
APPLICATION FILED AUG. 19, 1902.
NO MODEL. 13 SHEETS—SHEET 13.

No. 763,692. Patented June 28, 1904.

UNITED STATES PATENT OFFICE.

WILLIAM HENRY PIKE, JR., OF ST. LOUIS, MISSOURI, ASSIGNOR, BY DIRECT AND MESNE ASSIGNMENTS, TO PIKE ADDING MACHINE COMPANY, OF ST. LOUIS, MISSOURI, A CORPORATION OF MISSOURI.

ADDING AND RECORDING MACHINE.

SPECIFICATION forming part of Letters Patent No. 763,692, dated June 28, 1904.

Application filed August 19, 1902. Serial No. 120,222. (No model.)

*To all whom it may concern:*

Be it known that I, WILLIAM HENRY PIKE, Jr., a citizen of the United States, residing at St. Louis, in the State of Missouri, have invented certain new and useful Improvements in Adding and Recording Machines, of which the following is a specification.

This invention relates to adding and recording machines, although some features of the invention may be used on adding-machines which do not record.

The invention is particularly applicable to machines in which there is a separate series of keys for each adding-wheel; but some features of the invention could be employed on adding-machines using one series of keys only for all the adding-wheels, and it is to be understood that while my invention as illustrated and described is embodied in a machine having several series of keys I do not intend to restrict myself to the use of some of the features in any special class of machines.

The object of my invention is to generally improve the structure and mode of operation of adding and recording machines, and particularly to produce one which can be operated with a minimum of effort on the part of the operator and in which the possibility of involuntary error in manipulation is almost entirely eliminated.

The invention will be fully described hereinafter, reference being had to the accompanying drawings, in which—

Figure 2:
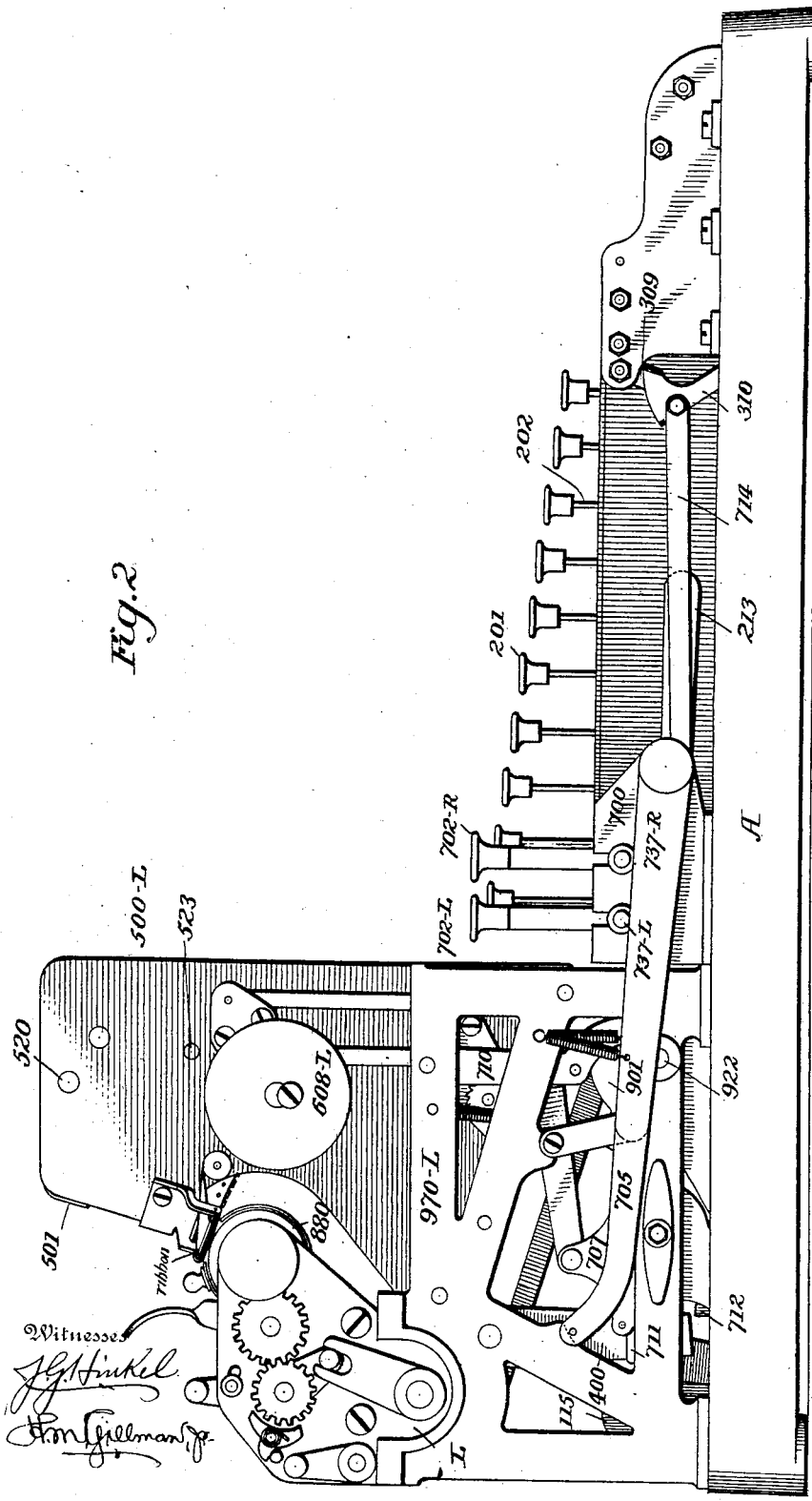
Figure 3:
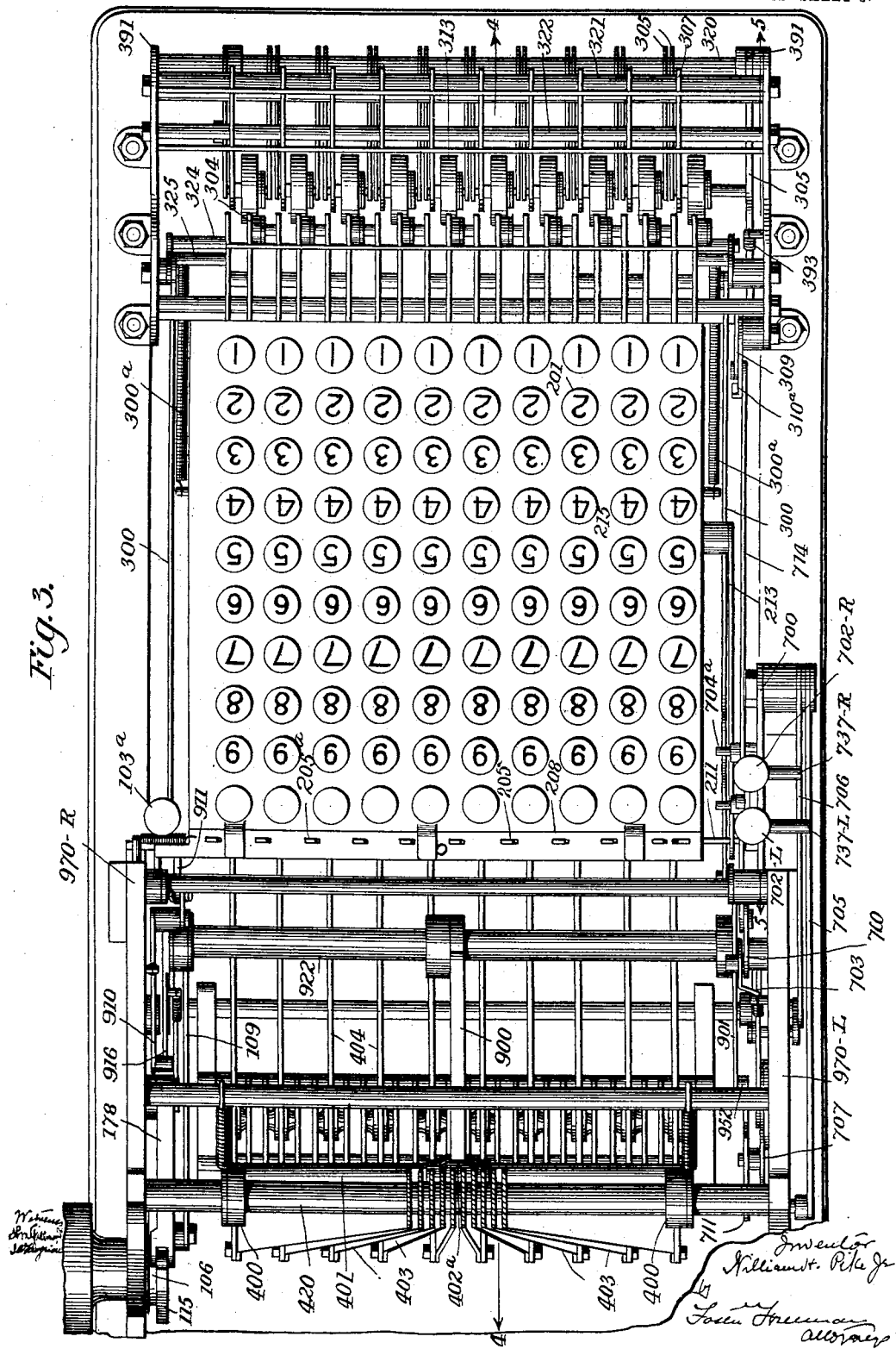
Figure 10:
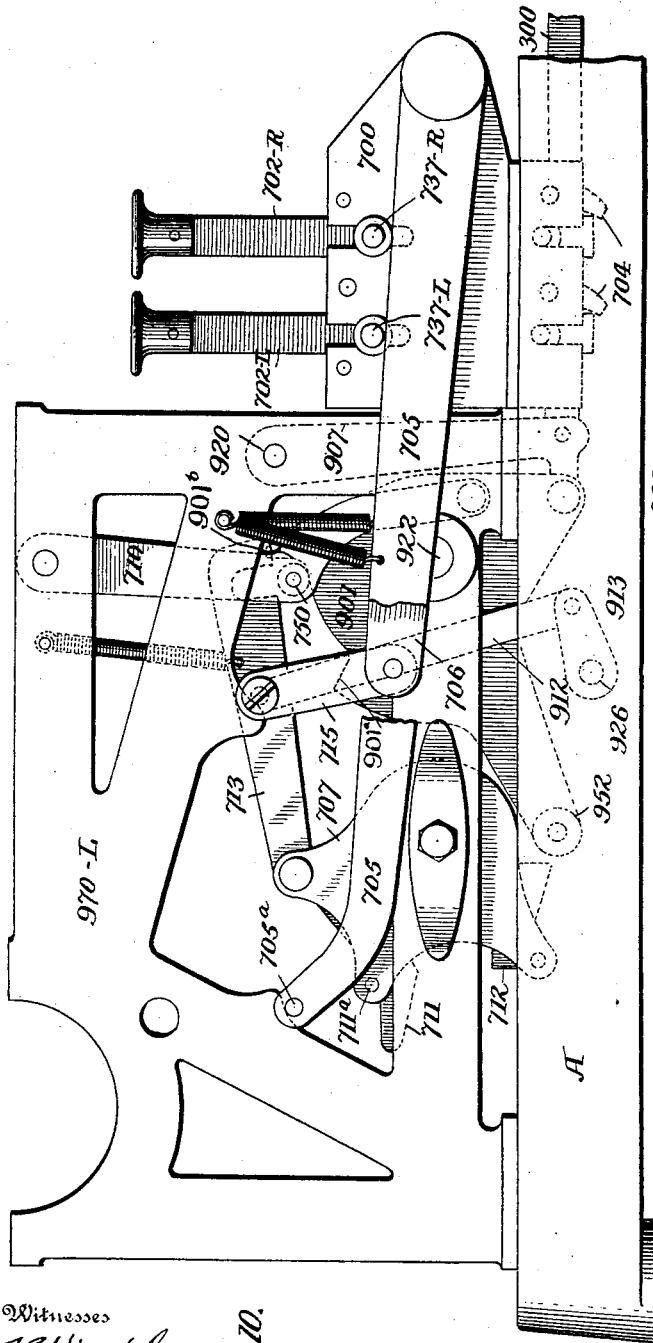
Figure 11:
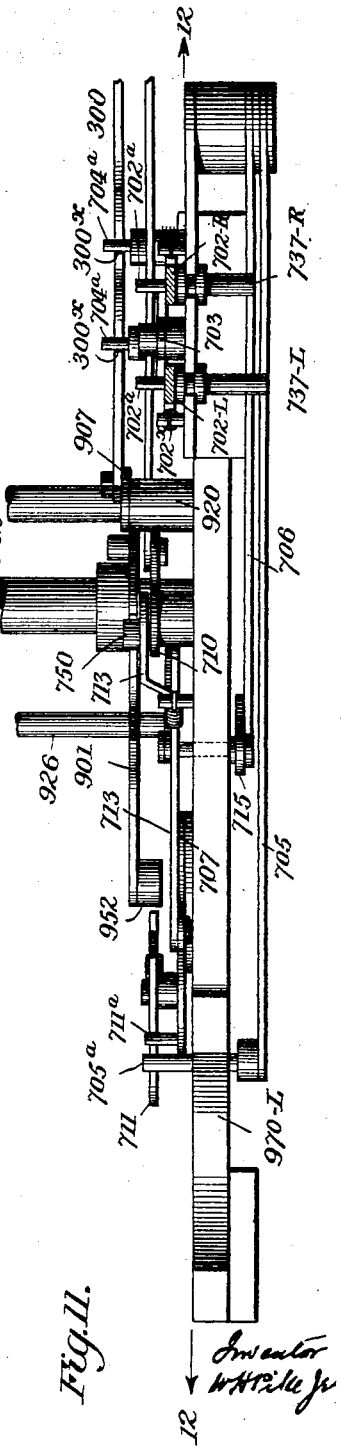
Figure 14:
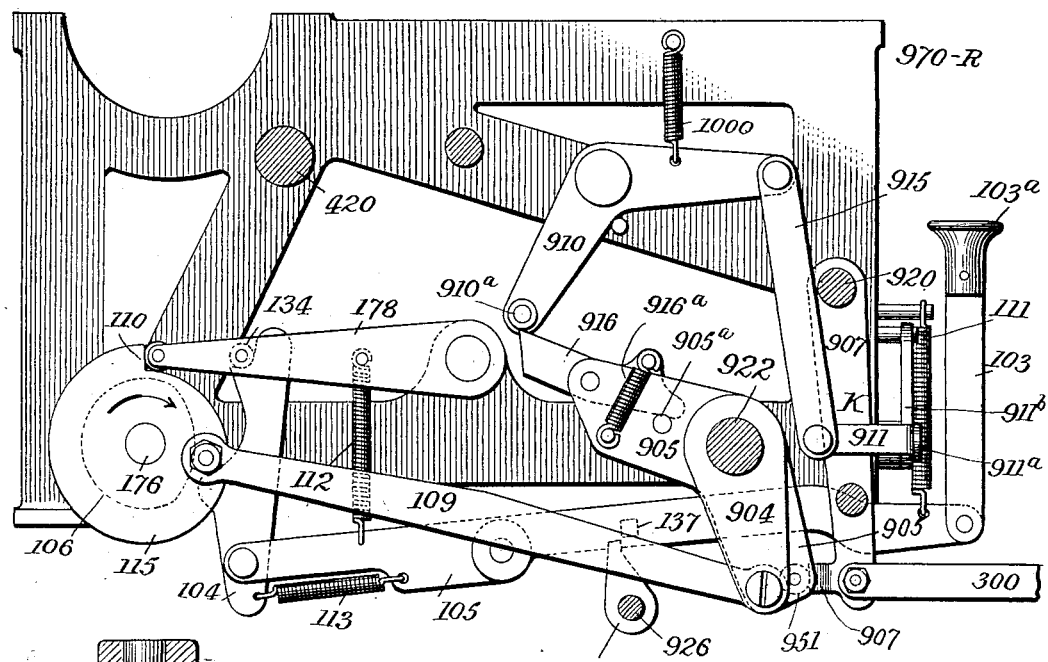
Figure 15:
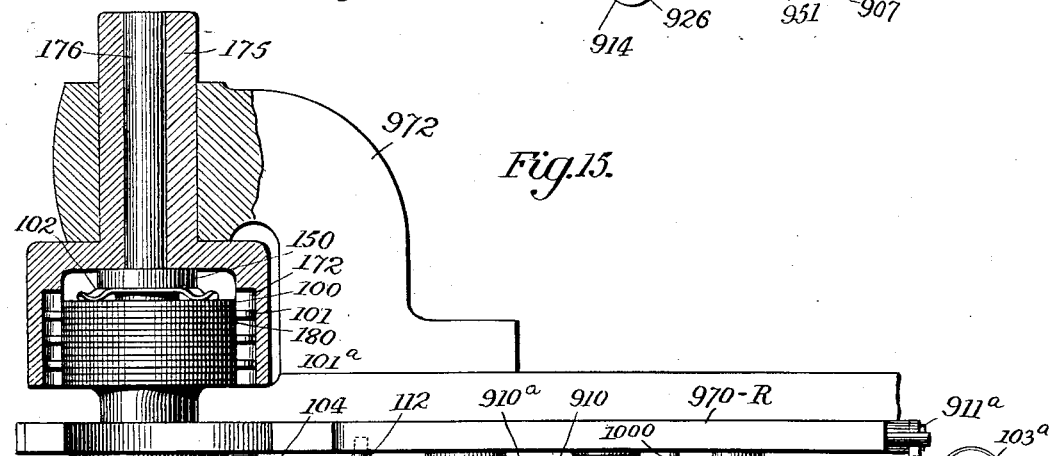
Figure 21:
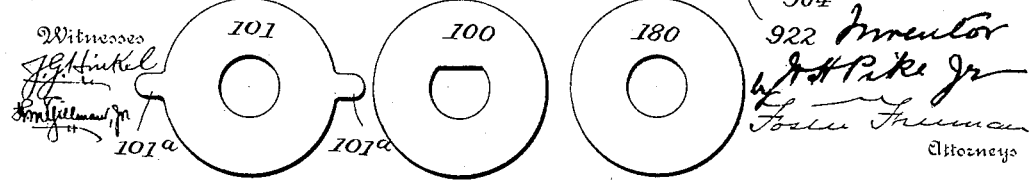
Figure 18:
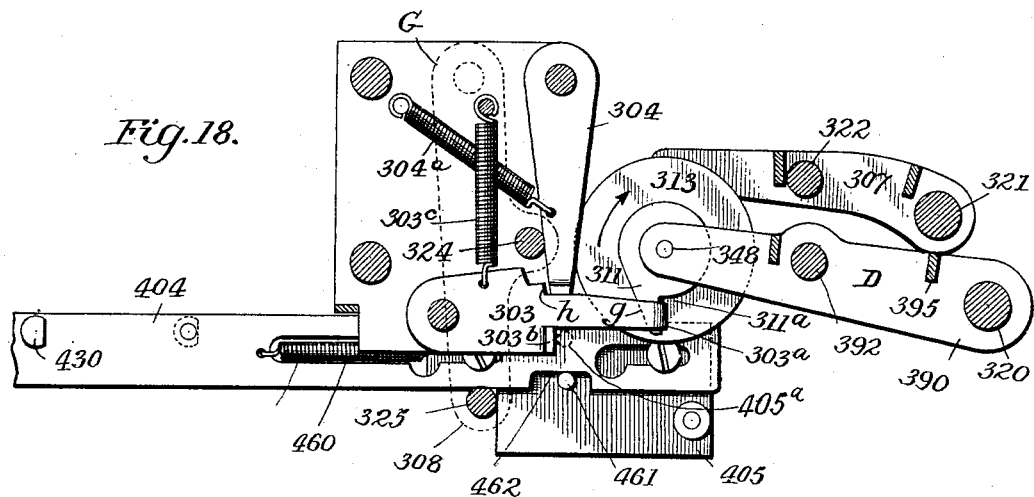
Figure 19:
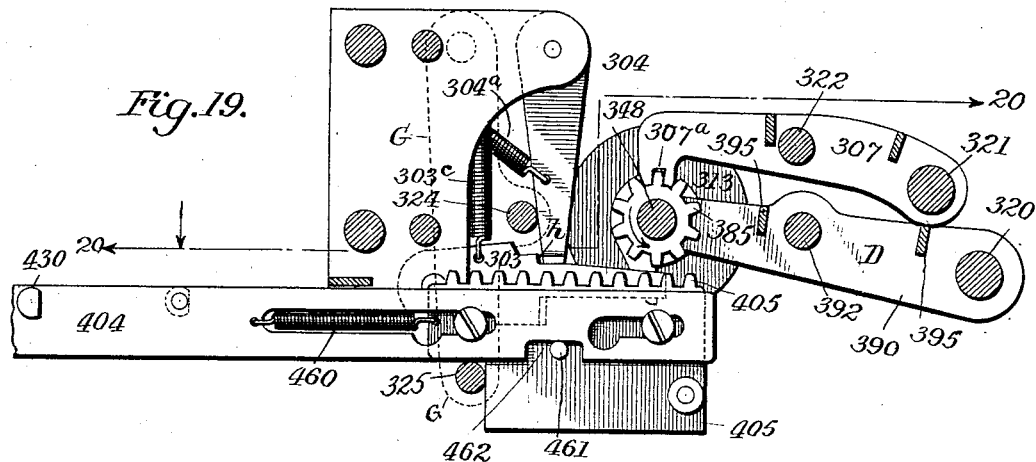
Figure 20:
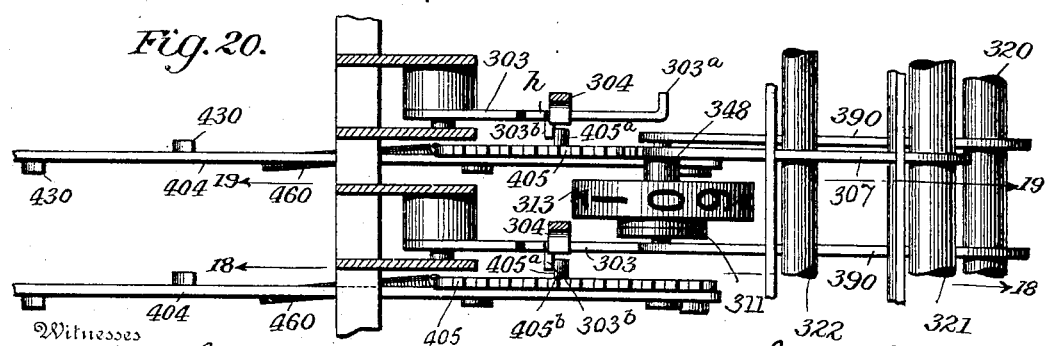

Figure 1 is a perspective view of a machine embodying my invention. Fig. 2 is a sectional side elevation. Fig. 3 is a plan view with the paper-carriage removed. Fig. 4 is a longitudinal central section of a portion of the machine on the line 4 4 of Fig. 3. Fig. 5 is a sectional side elevation on line 5 5 of Fig. 3 of the rear portion of the machine. Fig. 6 is a similar view, also on the line 5 5 of Fig. 3, of the front portion of the machine. Fig. 7 is a part plan of Fig. 6. Fig. 8 is a sectional elevation of the type-striking mechanism and adjuncts; Fig. 8ª, an enlarged view of one of the types and supports. Fig. 9 is a front view of Fig. 8. Fig. 10 is a side view of the total and subtotal actuating mechanisms. Fig. 11 is a plan view of Fig. 10. Fig. 12 is a sectional elevation on the line 12 12 of Fig. 11. Fig. 13 is a detail perspective view of a detent-shifting device used in connection with the total and subtotal mechanisms. Fig. 14 is a side elevation of the driving and starting mechanism. Fig. 15 is a plan of the same in part section. Fig. 16 is a sectional view of the key-operated mechanism. Fig. 17 is a vertical section on line 17 17 of Fig. 16 looking in the direction of the arrow. Fig. 18 is a sectional side view of the adding mechanism on line 18 18 of Fig. 20. Fig. 19 is a similar view on line 19 19 of Fig. 20. Fig. 20 is a plan view of a portion of the adding mechanism; Fig. 21, a detail view of the friction disks and rings of the driving mechanism; Fig. 22, a plan showing the arrangement of numbers at the lower ends of the types of each carrier.

*The driving means.*—A is the base. 313 represents adding-wheels, and 201 represents keys in series, each series numbered "1" to "9." The working shaft 922, Figs. 4, 14, 15, is a rock-shaft with two arms 904 and 905 at one end, and to the arm 904 is connected a link 109, also connected to the side of a cam-disk 115, Figs. 5 and 14, on a short shaft 176, around which turns a hollow driving-shaft 175.

All the movements of the different parts of the machine necessary to add and record any number after depressing the necessary keys are imparted on a single movement or revolution of the shaft 176, which is then arrested at a point where the said parts have assumed their normal position of rest. To avoid the delay, labor, and uncertainties resulting from operating the working shaft by hand, the shaft 175 is driven continuously from a suitable motor and has such a frictional or other connection with the shaft 176 that the two will turn together so long as the shaft 176 is free to turn; but when the rotation of the shaft 176 is arrested that of the shaft 175 may continue. Any suitable frictional or other connection capable of permitting the shaft 176 to be arrested when required may be used; but one which has proved effective will now be described.

The shaft 176 is provided with a series of disks 100, fitted on the shaft to turn with it, but movable on the shaft lengthwise. Alternating with these disks are rings 101, fitted to turn loosely on the shaft 176 and having projections 101$^a$ on their peripheries, and between each ring 101 and disk 100 is a ring 180, of non-abrasive material, these rings 180 being also fitted to turn loosely on the shaft 176. The shaft 176 is threaded to receive a nut 150, and a spring-washer 102 is interposed between the nut and the outer disk 100, and by adjusting the nut the rings and disks are pressed together. The inner end of the shaft 175 is enlarged and recessed, so as to inclose the rings and disks, and is provided with suitable grooves 172 to receive the projections 101$^a$ of the rings 101. The pressure of the nut 150 and washer 102 produces friction between the disks 100 and rings 101 and 180, which tends to turn the auxiliary shaft 176, supporting the disks. These parts constitute the frictional connection between the shafts 175 176, so that, although the shaft 175, Fig. 15, rotates continuously, the shaft 176, which operates the parts of the machine, cannot start until a detent—for instance, a latch 178—is lifted from the shoulder 110 of the cam-disk 115. This results from depressing a key 103$^a$, Figs. 1 and 14, thereby rocking a lever 105, connected therewith, and raising a link 104, on the upper end of which bears a lug 134 on the latch 178. A spring 112 draws down the latch 178. A cam 106 on the shaft 176 on each rotation pushes back the link 104 from below the stud 134, so that the latch 178 will drop into position to be struck by the shoulder 110 and stop the operation of the said parts after each number is registered or recorded—as, for instance, at the end of a complete rotation of the shaft and after effecting a complete oscillation of the shaft 922—and this results even if the key 103$^a$ is held down continuously. It will be seen that the working shaft is not actuated by the power of the operator, but is positively driven by the motor to effect a complete operation and is then automatically arrested, the operator simply depressing a starting device after the keys have been properly adjusted to determine the amount to be indicated.

*The adding or accumulating means.*—The recording devices, as shown, consist of type-levers 403, Figs. 4 to 8, one to each series of keys, and which oscillate on a shaft 420, and each is jointed to a strip 404, carrying a rack 405, which actuates the pinions 385, Figs. 4, 18, 20, secured to the adding-wheels 313, carried by a swinging frame D. Fixed pawls 307, Figs. 18, 19, 20, serve to lock the pinions 385 to prevent accidental turning.

Each rack 405 has a sliding movement on the strip 404 and is drawn back by a spring 460, Figs. 18, 19, 20. A lug 461, Figs. 18 19, on the rack projects into a recess 462 in the strip and limits the sliding movement of the rack.

When the adding-wheels are turned in the direction of the arrow, Fig. 18, the shoulders 311$^a$ of cams 311 (one at the side of each wheel) are carried away from lugs 303$^a$ on detents 303, and the inclined edge $g$ of each cam 311 will nearly contact with the end of its detent 303 when the wheel has been turned nine units or steps. In moving the tenth step the edge $g$ will depress the detent, which will thus carry a lug 303$^b$ on the detent 303 out of the path of a stud 405$^a$, Figs. 18 and 20, on the rack that coacts with the adding-wheel of the next higher order of numbers, and the rack will thus be permitted to move a step beyond its normal position at rest and thus move its coacting pinion and adding-wheel a step upon the completed revolution of the cam 311 of the wheel of the lower order.

When the detent 303 is depressed, a vertical pawl 304, Figs. 18 and 19, will move forward over a shoulder $h$ of the detent and then prevent it from rising until a frame G, Figs. 6, 18, 19, swings back a bar 324, carried thereby, and pushes back the pawls 304 from off the shoulders $h$ of the detents 303, which are then lifted by springs 303$^c$. The frame D is swung to carry the pinions of the adder-wheels into and out of engagement with the racks by either of two independent means actuated from the working shaft.

The left-hand arm 305 of frame D, Figs. 6 and 7, connects with a toggle-link 310, jointed to the other toggle-link 309, the movement of the toggle raising and lowering the frame D. The toggle is operated from a reciprocating link 714, the movement being limited by a lug on a plate 310$^a$ at the end of the link 310.

The link 714 is connected to an arm 710, Fig. 5, and as the shaft 922, Figs. 5 and 12, oscillates in one direction the rear shoulder 901$^a$ on a plate 901 on said shaft contacts with a stud 750 on the lever 710, Fig. 5, which swings forward. The return movement brings the shoulder 901$^b$ to the stud, swinging back the lever 710.

The stem 202, Figs. 16 and 17, of each numbered key 201 has notches 202$^a$ and 202$^b$ of different depths. Springs 280 lift the keys and pawls 207, which are secured to longitudinal shafts 220, engage the notches, and hold down the keys, the pawls of each series of keys being on the adjacent shaft, so that after one key of a series is depressed the depression of another key in the same series will swing out all the pawls and release the depressed key, which will rise. The depression of the upper blank key of a row swings the pawls to liberate a key of that row improperly depressed, the upper key rising as soon as pressure is removed therefrom, as the notches of such keys are not so arranged that they will be held down by the pawls.

On depressing a key its lower end is brought into the path of one of a series of studs or stops 430, projecting in both directions from the coacting rack-strip 404, and the key-stem thus limits and defines the subsequent movement of the strip and its rack and the extent to which the number-wheel is turned, the stops 430 being progressively farther from the key-stems, so the strip moves to a greater extent in proportion as the key depressed indicates a higher number, as shown, and the parts are arranged so that each strip has a movement of one step at each operation of the machine, even if no keys may have been depressed. This will bring the cipher-printing character into printing-line, but without turning the adding-wheel. The normal position of the stop 430 on the strip 404, which coacts with each key numbered "1," is two steps to the rear of said key, the position of the other stops, 430, being progressively one step farther to the rear of its coacting key-stop, the stud 430, which coacts with each "9" key, being ten steps away.

A detent-arm 205, Figs. 4, 13, 16, 17, secured on each shaft 220 near its end, is held in the path of the stop 430 on the strip 404 near the No. "9" key by a spring 282, Fig. 13, which also tends to turn the shaft 220 and hold the pawls 207 against the key-stems and in the notches thereof.

When all the keys in a column are up, the pawls 207 are all in the deep notches $202^b$, and the detent-arm 205 of each shaft acts as a stop for the coacting strip 404, which can only move one step forward until its stop 430 strikes the arm 205, securing the result before stated. When one of said keys is depressed, its pawl 207 is swung out from the deep notch and then enters the shallow notch $202^a$ and holds the key down, and all the coacting pawls swing out, but not far enough to remove them from the deep notches $202^b$ of the other keys of the series; but the coacting detent-arm 205 is carried out of the path of the stop 430 on the strip 404, which can then slide forward until its adjacent stop 430 strikes the stem of the depressed key.

The type-lever shaft 420, Figs. 4 and 5, carries two pendent arms 400, Fig. 3, connected by a cross-strip 401 and cross-rod 402, the latter carrying a roll $402^a$, Fig. 4, which bears on a cam-plate 900 on the shaft 922. The strip 401 holds the lower ends of the type-levers 403 in their rearmost positions each against the tension of a spring $404^a$.

The rack-strip 404 of each column at each operation where no keys are depressed moves forward one step until arrested by the detent-arm 205, and in this case the rack of said strip will not be moved.

When a numbered key is depressed, the strip 404 moves forward until its stop strikes said key, carrying the rack without turning the pinions, the frame D being normally elevated. After the movement of the strips ceases the frame D and pinions are depressed automatically and each rack engages the pinion and on returning turns the pinion and adding-wheel, the extent of revolution depending on the distance the strip 404 in returning to its position moves the rack.

To the swinging frame G, Fig. 6 and dotted lines Figs. 18, 19, are attached two longitudinal rods 300, Fig. 7, connected to a swinging frame K, Figs. 4, 5, 10, 12, 14, 16. A roller-stud $951^a$ on the plate 901, Figs. 5 and 16, and a roller-stud 951, Fig. 14, on the arm 905, Fig. 14, when the machine is at rest are in contact with projections $907^a$ on the frame K, and the swinging frame G is thus held in forward position.

In operating the machine the shaft 922 is rocked and the roller-studs on the plate 901 and arm 905 are first withdrawn from the projections $907^a$ on the two rods 300, and the frame G is drawn to the rear by springs $300^a$, Fig. 6, so that the pawls 304, Fig. 18, will bear against the edges below the shoulders $h$ of the detents 303 under spring tension, and the racks 405 can be drawn by their springs 460 backward, with the lugs $405^a$, Fig. 20, resting against the lugs $303^b$. When a number key or keys have been depressed and the working shaft is operated, each coöperating strip 404 is carried forward to an extent depending on the key depressed. The frame D is then depressed to bring each pinion 385 into engagement with its rack 405, and on the next backward movement of each strip the number-wheel is turned to an extent corresponding to that to which the rack was carried forward. If any one wheel is turned sufficiently to depress the adjacent detent 303, the backward swing of the frame G will then permit the pawl 304 to swing back, when, having escaped contact with the edge in front of the shoulders $h$, it passes above said shoulder as the cam 311 depresses the detent, and the pawl 304 then holds down the detent until the wheel completes its movement and the action for carrying to the next wheel is effected. As the movements of the working parts of the machine terminate the frame G swings forward and the pawls 304 are swung forward to normal position and release the detents 303, which then rise. This also moves the racks 405 forward to normal position by the contact therewith of the cross-bar 325, carried by the arms 308 of the frame G.

It will be understood that each spring 460 forms a flexible connection between one of the strips 404 and the rack 405, supported by said strip. Normally the detent $303^b$ holds the rack 405 in such position that the spring 460, connected to that rack, is under tension.

If during the operation of the machine the strip 404 and rack 405 of the order to which an additional carrying operation is to be imparted are stationary or in their normal positions at the time the cam 311 of the wheel 313 of the next lower order rocks the lever 303, the spring 460 being, as aforesaid, under tension collapses, and although the strip 404 remains stationary the rack 405 is moved relative to said strip through a distance corresponding to one step. If, however, the spring and rack of the order to which the carrying is to be transmitted be in motion at the time when the detent 303$^b$ is removed from the path of the stud 405$^a$, the rack will continue to move with the strip 404 throughout the entire movement of the latter, the spring 460 acting at such time merely as a connecting-link between the strip and rack and will not be stopped, as it commonly is, one step before the strip 404 completes its rearward movement— that is, in the latter case the rack and strip will move together throughout the entire rearward movement of the strip, whereas normally the detent 303$^b$, acting on the stud 405$^a$, stops the rearward movement of the rack one step in advance of the completion of the corresponding movement of the strip.

*The recording means.*—The roller-platen 880, Figs. 4, 5, 8, is below the curved arms 403$^b$ of the type-levers 403, each, as shown, carrying ten sliding type-bars 490.

At each full operation effected by one rocking movement of the shaft 922 each type-carrier will move at least one step, so that in all columns where no key is depressed the carriers will be in position to print ciphers and in columns where keys are depressed the carriers will be moved different degrees to bring each type-bar in position to print a figure corresponding to the key depressed in such column.

The type-bars are moved to effect the printing by spring-actuated hammers 501, one to each type-carrier.

A series of pivoted catches 503, Fig. 8, hold back the hammers, each of which has a lateral lug 501$^a$ on its forward end engaging a hook 503$^b$ on the head of a swinging catch 503.

At each operation of the machine the arm 903, Fig. 8, moves to the position indicated in dotted lines, lifting at the end of its movement a link 511 and rocking a pawl-carrying frame H on its shaft 530. In columns where a key is depressed the type-levers 403 will have moved sufficiently to carry projections 403$^a$ above studs 559 on pawls 504, pivoted at 505$^a$ to the frame H, which pawls have hooks that when the forward end of the frame H descends will engage projections 503$^c$ of the respective catches 503 and swing back their upper ends and release the hammers. In columns where no key is depressed the type-levers do not rise sufficiently to carry their projections 403$^a$ above the roller-studs 559, and when the pawls 504, coacting with such columns, descend their upper ends will be pushed forward by the projections 403$^a$, and their hooks will not engage the projections 503$^c$, and consequently the hammers in such columns will not be released. To print such ciphers to the right of the columns of highest order in which a figure is printed, each catch 503 has a lug 503$^a$ engaging the catch 503 next to the right, (see Fig. 9,) and the movement of one catch 503 to release its hammer will be transferred to the next, and so on, and thus effect the movement of all the other catches 503 to the right, even if no key has been depressed. This permits the hammers to the right to be released to print ciphers; but no catches to the left will be moved.

To restore the hammers to normal position, there is a swinging frame I, Fig. 8, consisting of the side levers 502 and connecting-bars 550 558, the latter extending across under the hammers. A projection 900$^a$ on the cam 900 on the shaft 922 engages the bar 550 and swings the frame to lift the bar 558 and the hammers as the shaft 922 rocks on returning to position.

In starting, the frame I swings to carry the bar 558 down, leaving the hammers free.

*The adding or accumulating operations.*— To add different amounts together, the proper keys are depressed, and the starting-key 103$^a$, Fig. 14, is depressed, lifting the latch 178 and permitting the shaft 176 to make one effective movement, when the connecting-pitman 109 will rock the shaft 922 and the main cam 900, Fig. 4, will be rocked and permit the frame J, Figs. 4 and 5, to swing forward, and thus permit the type-levers and strips 404 to move, under the influence of the springs 404$^a$, until in those columns where no keys are depressed the strips are arrested by the detents 205, Figs. 13 and 16, and where keys have been depressed the strips are arrested by their respective key-stops. The racks 405 remain stationary until the strips 404 have each moved one unit, when the racks will also move. This permits each strip when no key is depressed to move sufficiently to bring the type-carrier into position to print a cipher at the printing-line.

The first portion, 900$^b$, of the cam 900, Figs. 4 and 8, permits no movement of the frame J, Fig. 4. A second portion, 900$^c$, permits the entire forward movement of the frame J, and a third portion, 900$^d$, does not affect the movement of the frame. This allows certain movements of other parts while the strips 404 and racks 405 are not in motion. After the strips are arrested, the pinions are thrown into gear with the racks and on the return motion of the cam 900 the strips 404 and racks 405 are returned to their normal position, the racks turning the pinions a number of units, depending on the extent of return movements of the strips 404 and equal to the numbers expressed by the depressed keys. The final part of the return movement of the shaft 922 causes the plate 901, Figs. 5 and 10, to move the lever 710 and the link 714 to break the joint of the toggle 309 310 and permit the frame D, Fig. 19, to rise and disengage the pinions from the racks.

To lock down a depressed key and lock all other keys in the same series against depression during the operating movements of the shaft 922, a series of sliding strips 204, Figs. 16, 17, have projections $204^b$, adapted to enter holes $204^c$ in the key-stems which are depressed. The strips are moved in one direction by springs $204^a$ and in the other by a cross-rod 927, carried by the frame K, Figs. 4, 16. When the shaft 922 begins to oscillate, the frame K will swing and allow the strips 204 to move toward the rear under shoulders $202^x$ of keys that are not depressed and hold them up, and a projection $204^b$ will enter the hole $204^c$ of a depressed key and lock it down even if its pawl be accidentally disengaged from its notch $202^a$.

The shafts 220 can be rocked automatically to throw out all the pawls 207 by a sliding cross-strip 208, Figs. 13, 16, 17, having elongated slots into which project lugs $205^a$, on the arms 205. This is effected from the rocking of the shaft 922. Thus at the commencement of the motion of the shaft 922, Fig. 14, the arm 905 carries a latch 916 past a stud $910^a$ on a lever 910, a spring permitting the latch to yield and pass by the stud, and on the return motion of the shaft 922 the beveled edge of the latch 916, contacting with the stud $910^a$, swings the lever 910, and passing by permits the lever to return to its normal position under the action of a spring 1000, Fig. 14. This lever 910 is connected by a link 915 with an angle-lever 911, Figs. 14, 15, 16, pivoted at $911^a$ to the side frame and provided with an arm $911^b$, Fig. 17, which extends loosely through a slot in the end of the strip 208, and the movement of the lever 910 will thus rock the lever 911 and slide the strip 208 in the direction of the arrow, Fig. 17, and thereby withdraw all the pawls 207 and release any key which may have been depressed.

*Recording totals and subtotals.*—To record the total, it is necessary to control the movements of the recording devices by the accumulating mechanism—as, for instance, by controlling the movements of the racks by the pinions of the wheels 313, the racks in such case being engaged with the pinions when the racks and the strips 404 are moving forward under the action of the springs $404^a$. The rotatory movement of the pinions and wheels 313 is thus in the reverse direction to that when accumulating, the effect being that the amount accumulated is subtracted as the wheels and pinions return to the zero position. The pinion-cams 311, Figs. 18, 20, arrest the reverse rotation of the wheels at the zero position when their shoulders engage the lugs $303^a$ of the detents 303. As in accumulating the wheels have advanced in the direction of the arrow, Fig. 18, a number of steps from the zero position, so in returning to the zero position the racks and strips are allowed to move forward the same number of steps until the shoulders of the cams contact with the detents, thus moving the type-levers correspondingly and bringing the proper types in position to indicate the total as accumulated. The accumulating-wheels will be left at zero after registering or printing the total, except when the total is to be reaccumulated on the wheels 313, which is effected by keeping the racks and pinions engaged when the racks are again moved to the rear or restored. These results are effected by so setting the parts as to vary the times of engaging and disengaging the racks and pinions, and one means of doing this is by two keys, distinguished as "total" and "subtotal" keys $702^R$ and $702^L$, Figs. 12, 16, and 17.

At the rear of the shaft 922 is a shaft on which rocks a plate 707, carrying two dogs 711 712, normally held in contact with stops by a connecting-spring. (Shown in dotted lines, Fig. 12.) To this plate is pivoted a link 713, which is raised by a spring and has a notch adapted to engage the stud 750 in the lever 710. Two parallel levers 705 706 extend past the keys $702^L$ $702^R$, and past the plate 901, and the lever 706 is connected by a link 715, Fig. 9, with the link 713.

When the total-key $702^R$, Figs. 2, 10, 12, 17, is depressed, its stud $737^R$, Fig. 10, depresses the lever 706, Figs. 10 and 11, and the connected link 713, the slot in which, Fig. 5, engages the stud 750 on the lever 710, so that the lever 710 and link 714 will be operated from the plate 707. When the shaft 922 commences to move, the roll 952, Figs. 5 and 12, on the arm of the plate 901 moving upward contacts with the rear edge of a dog 712, rocking the plate 707 in the reverse direction of its arrow, Fig. 12, and the link 713, (now connected to the lever 710, Fig. 5,) and through the link 714 and connections straightens out the toggle and depresses frame D, causing the pinions to engage the racks as the strips 404 move forward with the racks until the wheels 312, turning in the reverse direction of the arrow, Fig. 18, return to the zero position, where they are arrested by the shoulders of the cams 311 contacting with the projections $303^a$ of the detents 303. The racks will be held in their forward position during the printing action, while the part $900^d$ of the cam 900 moves in one direction past the roll $402^a$, Figs. 4 and 8. On the return movement the roll 952, Fig. 12, contacts with the forward edge of the upper dog 711 and rocks the plate 707 in the direction of its arrow, and the link 713 pulls the lever 710 rearwardly, bending the toggle and lifting the frame D, disengaging the pinions from the racks. The continued movement of the cam 900 in the direction of its arrow, Figs. 4 and 8, restores the racks to their forward position.

The subtotal-key $702^L$, Figs. 2, 10, 11, 12, 17, operates on a second lever 705, Fig. 11, which has a lug $705^a$, Fig. 10, which when the lever is depressed contacts with the tail of the dog 711 and depresses the tail of this dog, swinging it out of the path of the roll 952, which therefore in such case cannot operate it to rock the plate 707, and renders the said plate then inoperative to shift the lever 710 and the racks. The subtotal-key stud $737^L$ projects over both the levers 705 and 706, so that when the subtotal-key is depressed the lever 706 is carried down with the lever 705 and the open-slotted link 713 is engaged with the stud 750 on the lever 710, and therefore when the machine is thus operated the pinions are thrown into engagement with the racks on the plate 707, being rocked by the contact of the stud 952 and pawl 712 before the racks move forward, and they continue engaged on the reverse movement (as the stud 952 on descending will not contact with the pawl $711^a$) until the racks are restored to their rear position, when the frame D is raised and the pinions are disengaged by the action of the front shoulder $901^b$, Fig. 12, on the plate 901 contacting with the stud 750 on the lever 710, as in accumulating.

The keys $702^R$ and $702^L$ each carries a stud $702^a$, and when either of the keys $702^{LR}$ is depressed its stud swings an anchor-plate 703, Fig. 12, out of its path and under the other stud, thus preventing the other key from being depressed, so that both cannot be depressed at once.

There are two pawls 704, Fig. 12, each adapted to engage a notch $702^b$ in a key-stem, and each pawl has a stud $704^a$, which when the machine is at rest engages a shoulder $300^\times$, Figs. 6 and 12, of the connecting-rod 300, and when the shaft 922 has about completed its movement the rod 300 will be moved with the frame K toward the front of the machine, and its shoulder $300^\times$ will engage the stud $704^a$ on the pawl and disengage the latter from the key-stem, and the key will then rise under the influence of its spring $702^\times$.

It is desirable to prevent the machine from being operated when either of the total-keys is in a partly-depressed position, and to this end there is provided a detent, the same being a lug 137. There is pivoted to the slotted link 713, Figs. 5 and 10, a link 912, connected to an arm 913 on a cross-shaft 926, carrying also an arm 914, Fig. 14, extending upward at the side of the starting-lever 105, and the lug 137 is on this lever, and when the starting-key is depressed is in the path of movement of the arm 914. If either the arm 914 or lug 137 is moved slightly out of its normal position, the movement of the other is prevented.

When a total-key is fully depressed, the rock-shaft 926 has moved the arm 914 so as not to obstruct the lug 137, and the lever 105 can then be depressed. When either of the total-keys $702^R$ or $702^L$ is depressed, it is necessary to swing the detents 205 out of the paths of the studs 430 so the strips 404 and racks may move under the control of the pinions. This is effected, Fig. 12, by a projection $702^y$ on each of the total-keys, which projections contact with a stud $213^a$ on a pivoted arm 213, Fig. 17, the rear end of which, Figs. 12 and 13, contacts with a bell-crank lever 211, one end of which enters a slot in the strip 208, but does not interfere with the usual individual movements of the detents. When a total-key is depressed, its projection $702^y$ depresses the arm 213, which rocks the bell-crank lever 211 and moves the strip to the left, thus swinging all the detents out of their normal positions and releasing the strips 404.

To prevent both total and subtotal keys being depressed at the same time, an anchor-plate 703 is pivoted between the total-key stems $702^R$ and $702^L$ and normally held in a central position by a spring $703^a$. The plate has two projecting arms $703^b$ with angular faces, and on each key-stem is a stud $702^a$ in position to contact with one of the projecting arms.

From the foregoing it will be seen, referring to Figs. 5, 6, 10, and 11, that the swinging of the lever 710 straightens or bends the toggle and is the means of throwing the racks and pinions into and out of gear, and that in the normal operation of the machine in accumulating the lever 710 is swung forward by the contact of the shoulder $901^a$ of the plate 901 to bring the gears into engagement and on the next action the shoulder $901^b$ reverses this arrangement. It will further be seen that when the total-key $702^R$ is depressed, depressing the levers 706 and 713, the lever 710 is then operatively connected with the plate 707, and as the plate 707 is rocked by the contact of the parts 952 and 712 the lever 710 swings with its stud 750 following the shoulder $901^b$, so that the lever 710 swings forward (when normally it would be at rest) and the gears are engaged at once as the lever 710 begins its movement. The racks are therefore engaged with the pinions before the strips move forward. When on the reverse rocking of the shaft 922 the part 952 strikes the part 711, the plate 707 is rocked in the reverse direction and the lever 710 swung back, and the gears are disengaged when the wheels are at zero and before the racks move backward.

When the subtotal-key $702^L$ is depressed and both the levers 705 and 706 carried down, the stud $705^a$ so tilts the part 711 that it will not be struck by the part 952 and the plate 707 will not be rocked by the contact of these parts, so that the lever 710 will not swing back until the shoulder $901^b$ strikes the stud 750 on said lever, with the result that the gears remain in engagement during the backward movement of the strips.

From the foregoing it will be seen that the accumulating devices may at different times be independently controlled by two wholly independent operating means, which may be manipulated to determine the subsequent operations of the machine. First, the means that in accumulating puts the gears into engagement on one movement of the working shaft and out of engagement on the reverse movement; second, the means that in securing a total so sets the parts that the gears will be thrown into and out of connection at different times from that resulting from the first means in accumulating. Further, it will be seen that the said devices may be put under the joint action of both the other means in printing a subtotal. There are therefore devices capable of independent connection with the gears—one set of devices that only operate in accumulating and another set of devices that only operate in taking a total or subtotal. This distinguishes the machine herein set forth from all others.

The above-described machine also differs from all others in that the operations of the parts in printing a total or subtotal are all determined by the positions of devices adjusted or set in position before the operation of the machine begins and without any manipulation of the parts during the said operation—that is, causing the machine to print a total or subtotal is secured by the manipulation of parts wholly before commencement of the operation of the machine. The importance of these features is evident in considering the operations when the machine is driven in its operations by a motor at a high speed. Constructions which in taking a total or subtotal require manipulation of the parts during the operation of the machine may be effectively employed when the machine is worked by hand and time is afforded to change adjustments at proper intervals during such working; but when the entire working operation is effected in a fraction of a second, as with power-driven machines, it is impossible to shift the positions of parts manually at any predetermined moment, and it will be seen that by providing devices that may be set before the operations begin and which will then positively and automatically control such operations I secure the effective taking of totals and subtotals at the high-speed operations of a power-driven machine.

The stopping and starting means may be embodied in different forms and used with different control devices for actuating the registering devices whatever be their character, whether merely indicators or recorders, and it will be seen that while there is a continuously-rotating driving-shaft the working shaft, from which the other parts are actuated, is rocked only a part revolution after being connected with the driving-shaft and is then automatically arrested after effecting a complete action of the parts required to set the registering device. It will further be seen that the temporary connection between the two shafts results from the depression of the starting-key only and that therefore any of the number or other keys may be set or reset before any operation on the register results, and that after any number is registered the connection with the motor ceases automatically. It will further be seen that by providing means to separate the pinions and racks prior to the movements of the racks in either direction the numbers may be added or subtracted or totalized, as required, and that the shifting of the parts to engage or disengage the same may be effected through any suitable means by the operation of the special keys, and that the adjustment of parts to indicate or secure a total or subtotal is effected before the operating parts are put into connection with the motor.

In some cases it is desirable in type-writing or computing machines to vary the force of the printing-levers. To effect this in the present instance, the springs which actuate the hammers are attached to a frame capable of a limited movement in order to permit a variation in tension, so that the hammers may strike harder or softer blows, as may be required. This frame consists of a cross-bar 521 and two arms 506, hung on a cross-rod 520, and the springs 580 are connected to the cross-bar 521. The frame is raised or lowered to vary the tension by any suitable means, as a cam 522, Fig. 8. Any suitable devices for turning the cam to and locking it in desired position may be employed.

While I have referred to the parts for securing a total and subtotal as "keys," it will of course be understood that the same results may be secured whether these parts have keyheads for being pressed down by the finger or are otherwise shifted. Further, it will be understood that the terms "total" and "subtotal" are merely means of designating two totals, meaning that in one case the total is recorded and the machine cleared and in the other that it is recorded and retained in the machine to be carried into subsequent operations.

Several of the patentable features of the improvements in adding and recording machines described in the foregoing specification form the subject-matter of the claims of an application filed May 25, 1904, as a division of this application and bearing Serial No. 209,673, and therefore such features of the invention are not claimed herein.

I claim as my invention—

1. In an adding and recording machine, means for securing a record of additions or accumulations and either leaving the accumulating devices set at zero or retaining the accumulation, said means adapted in each case to be manipulated wholly before the operation of the machine in securing such record, substantially as described.

2. The combination with the keys, recording means and accumulator or number wheels of an adding-machine, of a key, and connections, whereby to mechanically hold the key down during each complete operation of the machine in taking totals to adjust the parts to secure a printing of a total without leaving the accumulator-wheels at zero, substantially as set forth.

3. In an adding and recording machine, means whereby to secure either the record of a total and leave the machine clear, or the record of a total and leave the same in the machine to be carried into subsequent operations, said means combined with devices adjustable to set the parts in position before the operation of the machine to secure either of said results without manipulation after such operation commences, substantially as set forth.

4. The combination in an adding and recording machine, of devices for taking totals and subtotals, including a total-key and a subtotal-key for operating said devices, and means for locking each in its depressed position during the entire operation of the machine in taking the total or subtotal, substantially as set forth.

5. The combination with the recording and accumulating devices and number-keys of an adding-machine, of two independent keys, and connections whereby each adjusts the parts to insure the recording of an accumulated amount and one adjusts the parts to retain the total on the accumulating devices, substantially as set forth.

6. An adding and recording machine having accumulating and recording devices, two independent means for actuating the accumulating devices, and subtotal-keys, and connections whereby to put either or both means into operative connection with the accumulating devices, substantially as set forth.

7. The combination with the accumulating devices, strips, and racks movable on said strips, of a restoring device for shifting the racks on the strips at the completion of each operation of the machine, substantially as set forth.

8. In an adding-machine, the combination of adding-pinions, strips, keys arranged in rows above the strips, devices for controlling the movements of the strips, racks for operating the pinions independently carried by and sliding to a limited extent on the strips, springs for impelling said racks in one direction, stops for limiting the movement of said racks, means for permitting the racks to move under the influence of their springs, and devices for imparting a return movement, substantially as set forth.

9. In an adding and recording machine, the combination of adding-wheels, racks for operating them independently, slides upon which the racks are movable, type-carrying levers, sliding strips, and connections between the same and the racks, substantially as set forth.

10. The combination in an adding-machine, of recording mechanism, adding-pinions, connecting devices between the said mechanism and pinions, totalizing and subtotal keys, and means for adjusting the connecting devices to vary the times of connection between the adding-pinions and recording means, substantially as set forth.

11. The combination in an adding-machine, of adding-pinions and actuating means, a device for controlling the connections between the two when accumulating, a second device for controlling the connection when recording the total and leaving the adding-pinions at zero, and means for combining the two devices to record a total and reaccumulate it, substantially as described.

12. In an adding and recording machine, the combination of adding-wheels, type-carriers, devices for operating the adding-wheels and moving the type-carriers simultaneously, and two separate keys and operating mechanisms for controlling the devices for operating the adding-wheels and the type-carriers, one of said mechanisms constructed to cause the said devices to operate to turn the wheels in one direction to accumulate and to adjust the type-carriers to print each number added, and the other mechanism constructed to cause the said devices to operate to turn the adding-wheels in the opposite direction to zero and to adjust the type-carriers to print the total and subsequently to take a subtotal by turning said adding-wheels, to again indicate the same total, substantially as set forth.

13. In an adding and recording machine, the combination of sliding racks, means for reciprocating said racks, independent type-carriers connected with said racks, a swinging frame, adding-wheels carried by the frame and provided with pinions to engage the racks, two independent keys and connecting means for moving the frame, means to swing the frame to engage the pinions with the racks prior to the movement of the latter in one direction whereby the racks will control the movement of the pinions for the purpose of adding, independent means for moving the frame to engage the pinions with the rack prior to the movement of the latter in the opposite direction, whereby the pinions will control the movement of the racks for the purpose of adjusting the type-carriers to print the total, and means for stopping said adding-wheels and pinions at zero, substantially as set forth.

14. In an adding and recording machine, the combination of sliding racks, means for reciprocating the racks, type-carriers connected to said racks, a movable frame, adding-wheels carried by the frame and provided with pinions to engage the racks, two independent keys, means for moving the frame to engage the pinions with the racks prior to the movement of the latter in one direction for the purpose of adding, means actuated from one of said keys for moving the frame to engage the pinions with the racks prior to the movement of the latter in the other direction for the purpose of adjusting the type-carriers for printing the total, and means actuated from the other key for moving the frame to engage the pinions with the racks and to maintain such engagement during the movement of the racks in both directions for the purpose of printing the total and subsequently moving the adding-wheels to again indicate the total, substantially as set forth.

15. The combination with the recording devices and adding-pinions, of racks for turning said pinions, and independent means, including two independent hand-operated keys, for carrying the racks and pinions into and out of engagement at different times, substantially as described.

16. In an adding and recording machine, means adapted to be wholly adjusted to set the parts in position before the operation of the machine to secure without further manipulation, first the record of a total leaving the machine clear, or second, such record leaving the total in the machine to be carried into subsequent operations, substantially as set forth.

17. The combination in an adding and recording machine, of accumulating devices, recording devices, and means for insuring the operation of the said devices to record totals and subtotals, said means adapted to be set in position before the operation of the machine and embodying keys and means for holding them in position after adjustment.

18. The combination with the recording devices and series of keys and connections, of a detent arranged to limit the movement of the recording device to one step on each operation of the machine without depressing a key, and to permit a greater movement corresponding to the number of the key when a key is depressed, substantially as set forth.

19. The combination with the recording and adding devices and keys of an adding-machine and with detents arranged to permit a movement of one step to the recording devices independent of the movements defined by the keys, of total and subtotal keys, and means for shifting said detents on setting either total or subtotal key, substantially as set forth.

20. In an adding and recording machine, the combination of a platen, type-carriers independently movable with respect to the platen, a series of spring-impelled hammers mounted to have independent movement toward the carriers to effect the printing, pivoted catches to hold the respective hammers against movement, a swinging frame, a series of pawls carried by the frame and movably supported to engage the respective catches to release them, and means for operating the swinging frame, substantially as set forth.

21. In an adding and recording machine, the combination of a platen, type-carriers independently movable with respect to the platen, a series of spring-impelled hammers mounted to have independent movement toward the carriers to effect the printing, pivoted catches to hold the respective hammers against movement, a swinging frame, a series of pawls carried by the frame and movably supported to engage the respective catches to release them, means for moving either of said pawls out of the path of its catch, and means for operating the swinging frame, substantially as set forth.

22. In an adding and recording machine, the combination of a platen, a series of independently-movable type-levers, type carried by said levers, means for moving the levers and type with respect to the platen, a series of spring-impelled hammers mounted to have independent movement to strike the type, a series of independently-movable catches to hold the hammers against movement, a swinging frame, a series of independently-movable pawls carried by the frame and supported to normally engage the catches when the frame is moved, means for moving the frame, and projections on the type-levers normally in the path of said pawls and adapted to move the pawls out of the path of the catches, substantially as set forth.

23. In an adding and recording machine, the combination of a series of spring-impelled type-striking hammers, a swinging frame having a cross-bar engaging said hammers, an oscillating shaft 922, a projection on the shaft engaging the swinging frame and normally holding the hammers under spring tension, and means for moving the frame and cross-bar away from the hammers when said projection is moved to release its pressure on the frame, substantially as set forth.

24. In an adding and recording machine, the combination of a series of type-striking hammers pivoted on a shaft, a series of springs respectively connected to the respective hammers and to a shaft, and means for adjusting the shaft to vary the tension of the springs, substantially as set forth.

25. In an adding and recording machine, the combination of a series of type-striking hammers pivoted on a shaft, a swinging frame carrying a bar 521, a series of springs connected to the bar and to the respective hammers, and a cam 522 engaging the frame and movable to effect variation of the tension of the springs, substantially as set forth.

26. In an adding and recording machine, the combination of a platen, a series of type supported to be struck against the platen, a series of hammers for striking the type, and means within the control of the operator for varying the force of the blow of the hammers, substantially as set forth.

27. In an adding-machine, the combination of a series of depressible key-stops, a strip having projections to coact with the key-stops, a detent for the strip, and a pawl to engage any depressed key, said detent and pawls connected to operate together, substantially as set forth.

28. The combination with the total-key of an adding-machine, of a detent for holding the same down, and means for releasing said detent as the parts of the machine assume their normal position, substantially as set forth.

29. In an adding and recording machine, the combination of series of depressible keys, a locking-strip to each series, means for holding it wholly out of action until the machine begins to operate, and adapted to lock all the keys of said series in their respective positions while the machine is being operated, and means for shifting the strip to locking position as the machine begins to operate, substantially as set forth.

30. The combination with the series of numbered keys, recording devices and adding-pinions, of sliding racks for turning said pinions, and independent means, including two hand-operated keys, for carrying the racks and pinions into and out of engagement at different times, substantially as described.

31. In an adding and recording machine, the combination of series of depressible keys, a common locking-strip to each series, said strips adapted to lock all the keys of all the series in their respective positions, means for shifting the strips to locking position after depressing the necessary keys, and means for shifting the strips to release the keys as the movements of the machine are completed, substantially as set forth.

32. The combination with the total and subtotal keys of an adding-machine and mechanism whereby a total or subtotal may be printed on operating said keys, of a detent, and connections whereby to shift the detent into position to prevent the operations of the machine until one or other of the keys is fully depressed, substantially as set forth.

33. In an adding and recording machine, the combination of a series of keys, movable stops, a total-key, a subtotal-key, and means operable from either key for restoring any of the stops to normal position, substantially as set forth.

34. The combination in an adding-machine, of a series of levers carrying type, a series of keys to each lever, strips each extending from the lower end of one of the levers along the base of the machine and below a series of keys, means whereby the movements of the strips are controlled by the keys, accumulating devices, means for actuating them from the strips, and means whereby the accumulating devices may be shifted to put them into connection with the strips prior to either the forward or backward movements of the latter, substantially as set forth.

35. An adding and recording machine including a device adapted to be set in position to take a total, another device adapted to be set in position to take a subtotal, and mechanism whereby the machine may be operated to secure the record of a total or subtotal according to the different adjustments of said devices, the last-mentioned mechanism so arranged as to operate differently when the total devices are set up from what it does when the subtotal devices are set up, substantially as described.

36. An adding and recording machine including appliances adapted to be wholly set in position before operating the machine to take a total or subtotal as desired, and mechanism whereby the machine may be operated to secure the record of a total or subtotal according to the different adjustments of said appliances, the latter so arranged as to operate differently when the total devices are set up from what it does when the subtotal devices are set up, substantially as described.

In testimony whereof I have signed my name to this specification in the presence of two subscribing witnesses.

WILLIAM HENRY PIKE, Jr.

Witnesses:
 BYRON E. BROWN,
 E. B. CRAM.